UNITED STATES PATENT OFFICE.

WILLIAM J. RAND, JR., OF BROOKLYN, E. D., NEW YORK.

IMPROVEMENT IN THE MANUFACTURE OF VEGETABLE GELATINE FROM ALGÆ.

Specification forming part of Letters Patent No. 128,248, dated June 25, 1872.

*Process for the Manufacture of Gelatine from Algæ.*

Be it known that I, WILLIAM J. RAND, Jr., of the eastern district of the city of Brooklyn, county of Kings and State of New York, have invented a new and useful Process of Manufacturing a Vegetable Gelatine from *Algæ*, suitable and healthful as an article of food.

Patents have been granted for making farines or farinas from some species of *algæ*, but my invention changes the nature of the material from a gelatinous substance to a gelatine, and may be properly called a vegetable gelatine.

Commercial gelatine as now manufactured is entirely animal, and is made from bones, tissues, and skins of animals, and contains little or no nutriment; but a gelatine from this vegetable substance is said to contain from seventy-five to eighty per cent. of nutritive matter.

My process is as follows: I take the species of *algæ* known as *chondrus crispus* and *plocaria candida* or *agar-agar*, and soak it in a bath containing about ten per cent. of carbonate of ammonia, which decomposes the iodine and bromine, and a peculiar substance known in chemistry as mannite, which the *algæ* contain. It is then removed to a bath containing two per cent. in excess of citric acid. The ammonia is then driven off by heat of about the temperature of 140° Fahrenheit. By this process it is partially desiccated and then dissolved in water at a temperature of 160° Fahrenheit. It is then thoroughly desiccated in flat pans and afterward powdered in suitable mills, and is then ready for the demands of commerce.

I do not claim a farina made from *algæ* or any other form in its natural state; but What I do claim as my invention, and desire Letters Patent to be issued by the United States, is—

1. The process substantially as described, or its equivalent, for making a vegetable gelatine from *algæ* named in the specification.
2. The product as described, as a new manufacture and commercial article.

WM. J. RAND, JR.

Witnesses:
W. J. RAND, Sen.,
C. V. GAUME.